United States Patent [19]

Missing

[11] Patent Number: 5,632,594

[45] Date of Patent: May 27, 1997

[54] MACHINE FOR ORDERING TEXTILE TUBES FOR A CONTINUOUS SPINNING MACHINE

[75] Inventor: Robert Missing, St. Helier, Channel Islands

[73] Assignee: Technological Research Co. Ltd., St. Hellier, Channel Islands

[21] Appl. No.: 214,815

[22] Filed: Mar. 16, 1994

[30] Foreign Application Priority Data

Apr. 14, 1993 [ES] Spain ................ P 93 00 758

[51] Int. Cl.$^6$ .................................................. B65G 47/34
[52] U.S. Cl. .................... 414/746.7; 57/270; 198/483.1; 198/801
[58] Field of Search .................... 198/440, 482.1, 198/801; 414/746.7; 57/127.5, 127.7, 270

[56] References Cited

U.S. PATENT DOCUMENTS

| | | | |
|---|---|---|---|
| 3,137,396 | 6/1964 | Winstead | 198/801 X |
| 3,477,559 | 11/1969 | Raasch | 198/801 |
| 3,499,519 | 3/1970 | Belk et al. | 198/801 X |
| 4,727,983 | 3/1988 | Lattion | 57/270 X |
| 5,165,615 | 11/1992 | Polnik | 57/270 X |

FOREIGN PATENT DOCUMENTS

| | | |
|---|---|---|
| 520036 | 2/1983 | Spain . |
| 539741 | 1/1985 | Spain . |
| 294962 | 6/1986 | Spain . |
| 1009397 | 11/1965 | United Kingdom ........ 414/746.7 |

Primary Examiner—Karen Merritt
Assistant Examiner—Janice L. Krizek
Attorney, Agent, or Firm—Michael J. Striker

[57] ABSTRACT

The machine for ordering textile tubes for entry into the distributor of a continuous spinning machine includes mechanisms that perform that ordering so that, independently, the textile tubes can be delivered to one side or the other of the spinning machine and devices for ordering tubes of different dimensions automatically. The ordering machine has a hopper, containing textile tubes, two parallel vertical conveyor belts provided with textile tube holders for the tubes which move the tubes from one end at the hopper to another end remote from it, a bottom discharge device for feeding the ordered tubes to the spinning machine and lateral guides for guiding the tubes to the bottom discharge devices. The textile tube holders are advantageously rubber sections vulcanized onto the conveyor belt of various transverse cross-sections or metallic angular sections fastened to the conveyor belts. Devices for ejection of excess tubes are provided associated with each textile tube holder and include springs which act through belt apertures between the holders to eject all textile tubes but one from each of the tube holders. Control covers with a device for detecting a jam-up in the guides can automatically halt the operation.

10 Claims, 6 Drawing Sheets

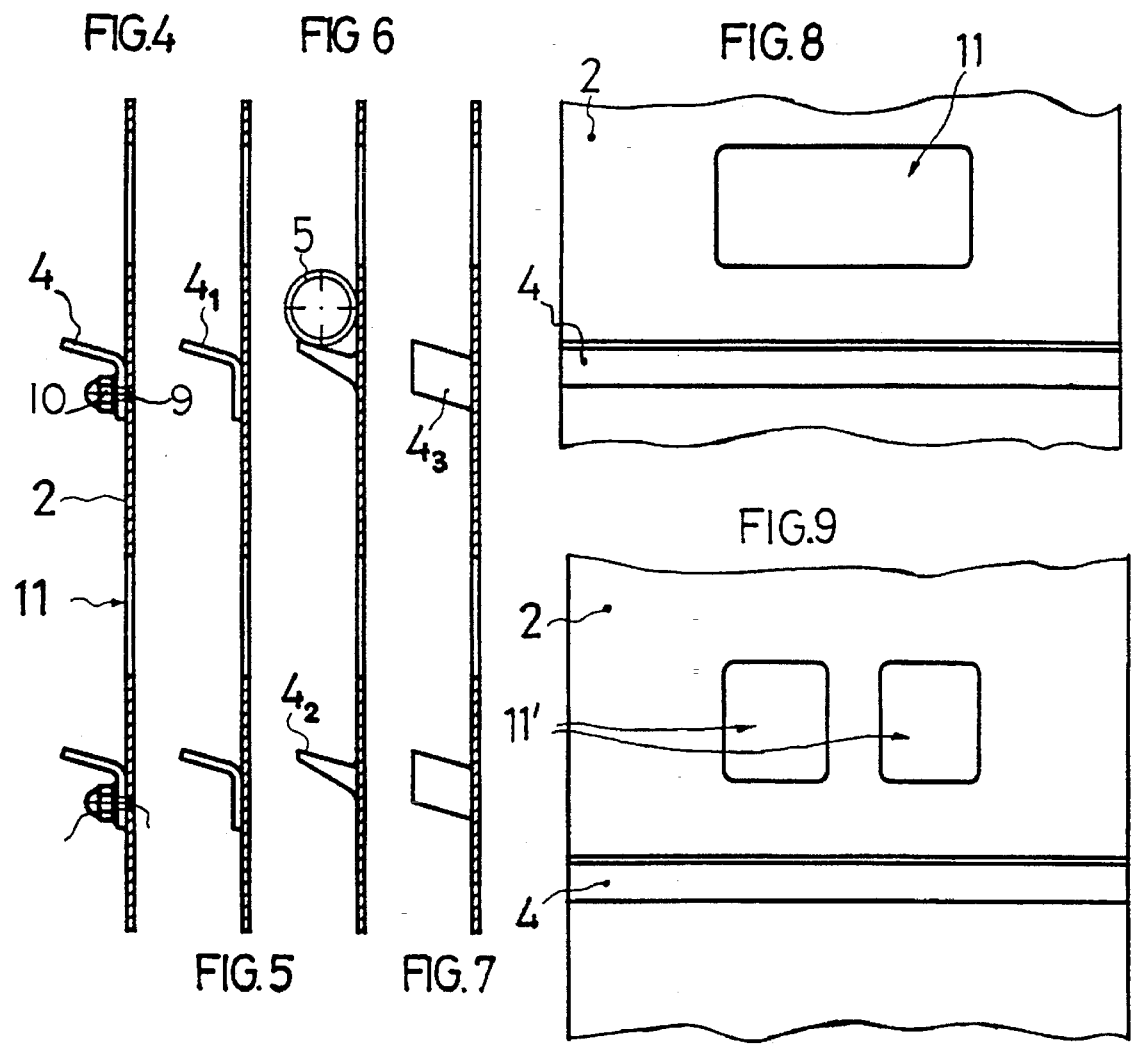

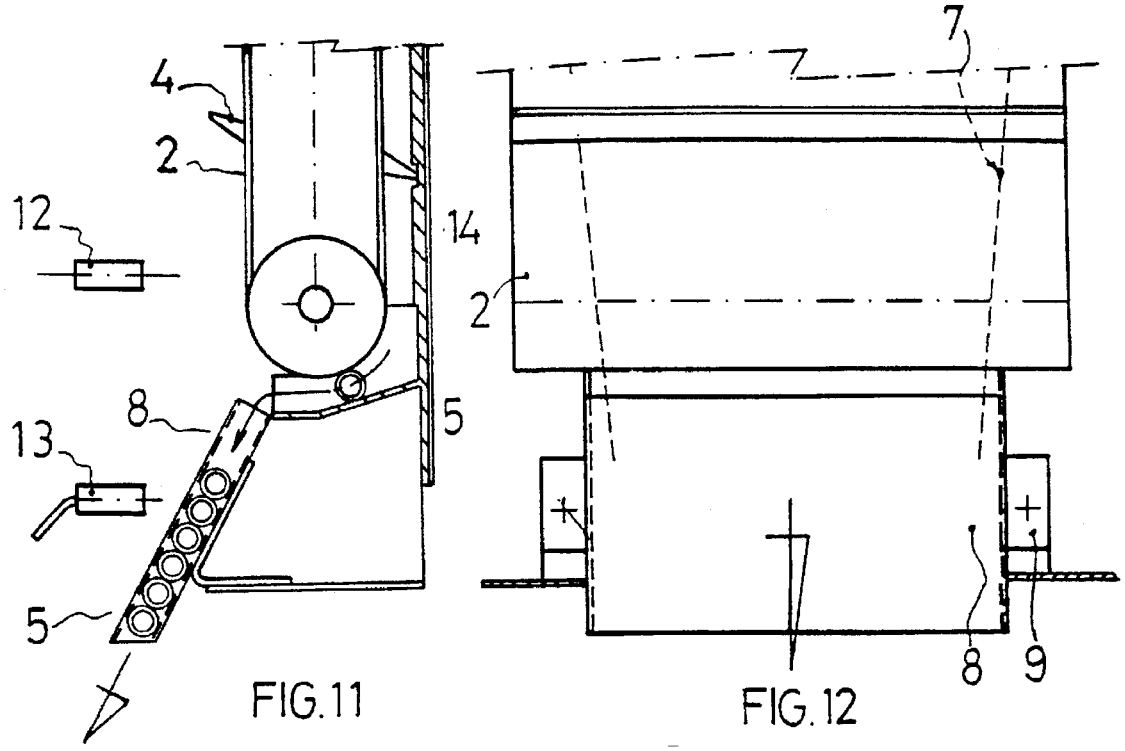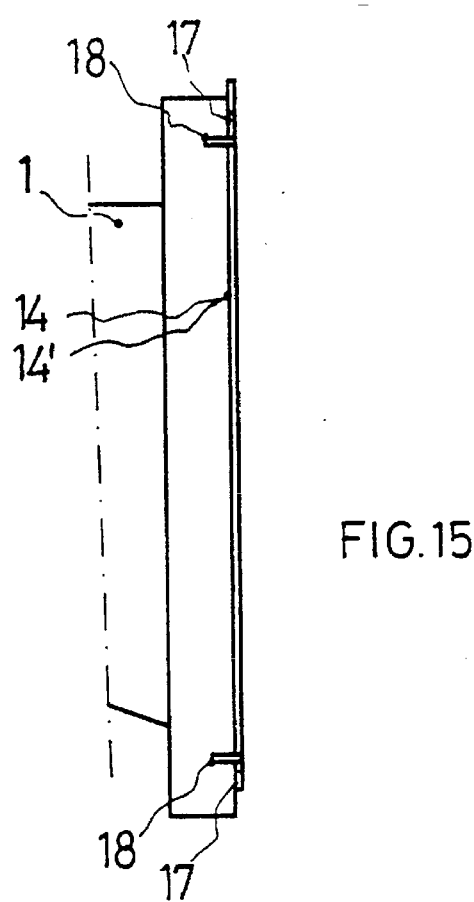

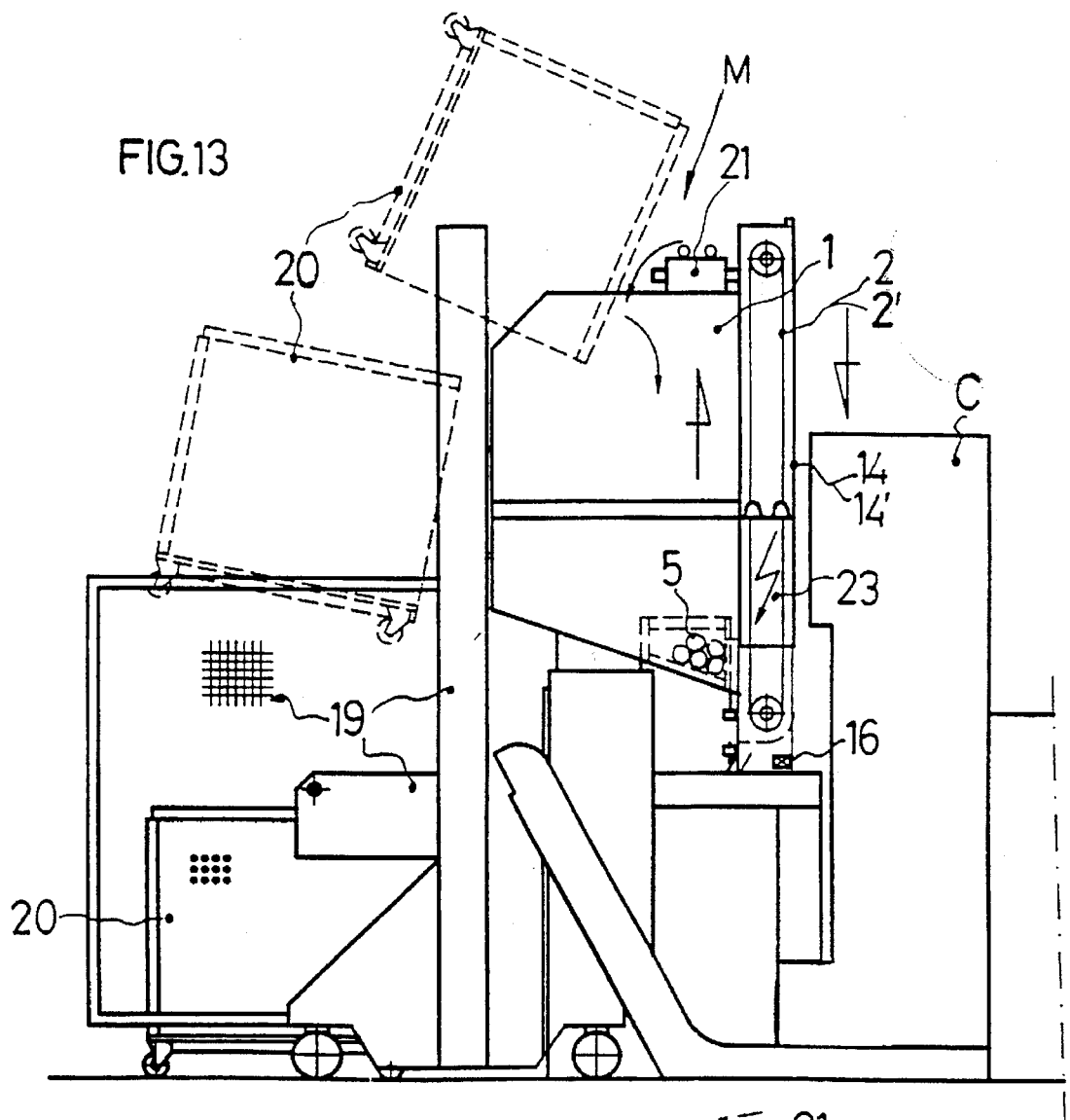

MACHINE FOR ORDERING TEXTILE TUBES FOR A CONTINUOUS SPINNING MACHINE

BACKGROUND OF THE INVENTION

The present invention relates to an improved machine for performing a process of ordering textile tubes used in a continuous spinning machine and feeding them to the motorized mechanism of the continuous spinning machine, which has a variety of important advantages over the currently available machines of this type.

Bumping mechanisms that regulate removal of textile tubes, applicable to ordering machines of the tubes, such as those described in Spanish Utility Patent No. 294,962, and textile-tube classifying and cleaning machines properly speaking, such as described in Spanish Patents 520,036 and 539,741, are known. All of these differ substantially from the machine according to the invention for ordering textile tubes for a continuous spinning machine that is described hereinbelow.

According to the present invention, the machine for ordering comprises automatic ordering means for ordering textile tubes automatically and without manual labor to form an ordered sequence of the textile tubes, which is adjustable for textile tubes of different dimensions, and means for delivery of the ordered sequence of textile tubes to a distributor of the continuous spinning machine.

The machine according to the invention advantageously comprises a hopper for the textile tubes; two identical parallel and vertical conveyor belts located at a rear wall of the hopper, electric drive means for driving each of the conveyor belts independently of each other, each of the conveyor belts being provided with a plurality of textile tube holders spaced at equal distances along the belts, so that when the conveyor belts are operated a single textile tube is taken from the hopper by each of the tube holders and carried to an end thereof remote from the hopper; bottom discharge means for discharge of the textile tubes to the distributor of the continuous spinning machine, and lateral guides for guiding the textile tubes raised by the conveyor belt to the bottom discharge means.

The machine according to the present invention for ordering textile tubes has been designed to produce a considerable savings in labor, with consequent reduced manufacturing costs for textiles, its operations being effected automatically in accordance with the current state of the art.

The machine according to the present invention is sturdy, not susceptible to damage, and is simple and reliable in its electromechanical operation. The special position of the elements that constitute the machine make it possible to perform the entire sequence of operations, from receipt of the tubes which are to be ordered to sequential delivery of the tubes, now ordered, permitting separate feed, and as desired, from both sides of the continuous spinning machine.

Similarly, by adequate adjustment means, the machine according to the invention can be used to order tubes of different length, according to the work to be performed by the continuous spinning machine.

The improved features in the ordering machine of the present invention provide advantages over the presently known devices performing the same function. The machine according to the present invention has an elevating loading mechanism or, alternatively, a conveyor belt distributing device, which provides greater maneuverability to the machine. The machine is also useful with continuous spinning machines equipped with an automatic doffer.

The machine according to the invention rapidly and automatically delivers textile tubes to both sides of the continuous spinning machine, and is a novel machine greatly superior, in all aspects, to those now known.

BRIEF DESCRIPTION OF THE DRAWING

The objects, features and advantages of the present invention will now be illustrated in more detail by the following detailed description, reference being made to the accompanying drawing in which:

FIG. 4 is a detailed cross-sectional view through a portion of a conveyor belt having tube holding means for the textile tubes in the ordering machine of FIG. 1;

FIGS. 5, 6 and 7 are cross-sectional views of different embodiments of the conveyor belt shown in FIG. 4 having an angular vulcanized tube holder, a vulcanized tube holder with a triangular cross-section and a vulcanized tube holder with a trapezoidal cross-section, respectively;

FIG. 8 is a detailed cutaway front plan view of a conveyor belt used in the ordering machine according to the invention having a single central aperture for ejection springs for surplus tubes, or those tubes that have residual yarn wound on them, on the tube holder;

FIG. 9 is a detailed cutaway front plan view of another embodiment of a conveyor belt used in the ordering machine according to the invention having a series of two equal central apertures;

FIG. 11 is a detailed side cutaway cross-sectional view of a portion of the machine according to the invention for bottom discharge of the textile tubes;

FIG. 12 is a front view of the apparatus shown in FIG. 11;

FIG. 13 is a detailed side view of another embodiment of an ordering machine according to the invention showing the loading elevator and continuous feed belt;

FIG. 14 is a plan view of the ordering machine shown in FIG. 13; and

FIG. 15 is a detailed side view of another embodiment showing the rear control cover and tube guide attached in a different manner than in the previous embodiments.

DETAILED DESCRIPTION OF THE PREFERRED EMBODIMENTS

Figure 1:
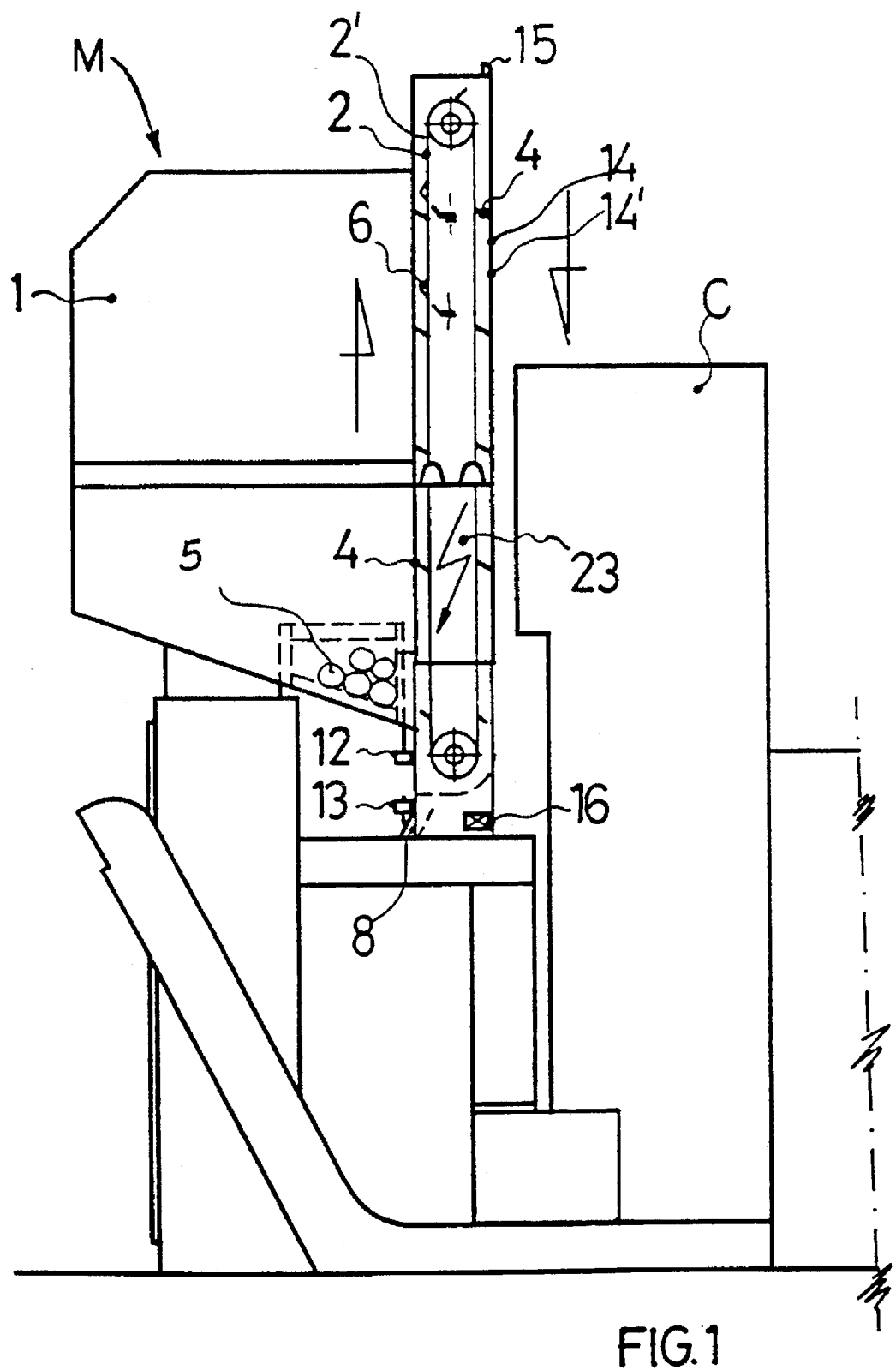
FIG. 1 is a side view of an ordering machine according to the invention, mounted on the front of a continuous spinning machine provided with an automatic doffer.
Figure 2:
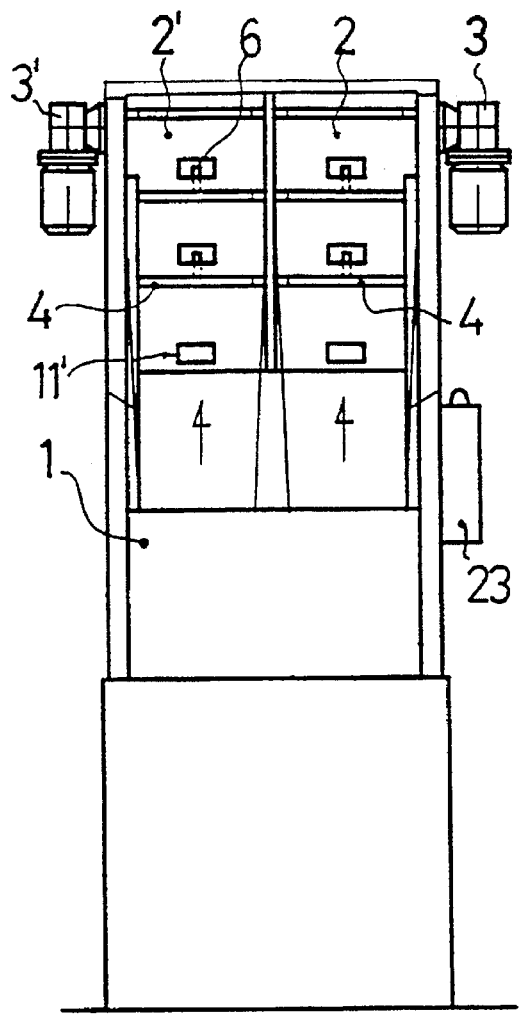
FIG. 2 is a front view of the ordering machine of FIG. 1 showing a number of structural elements of the machine in detail.
Figure 3:
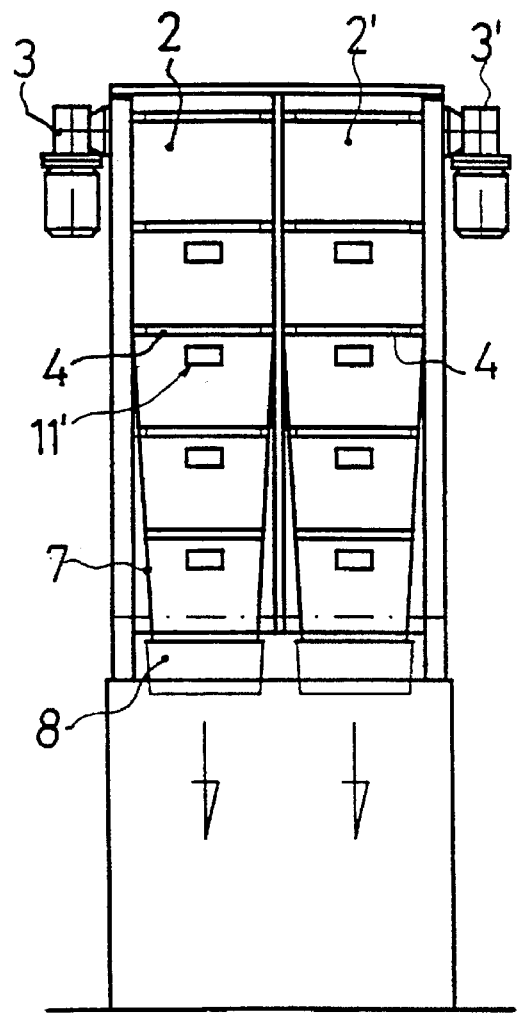
FIG. 3 is a rear view of the ordering machine of FIG. 1 showing the position of the guides for conveying the tubes.

As shown in the drawing a first embodiment of an order machine M according to the invention is installed at the front of a continuous spinning machine C, and is provided with mechanisms designed to perform the ordering of tubes for automatic delivery to the distributor of the continuous machine.

The ordering machine comprises a hopper 1, two continuous identical and parallel vertical conveyor belts 2 and 2' moving along a rear wall of the ordering machine M adjacent the front wall of the continuous spinning machine C. These conveyor belts 2 and 2' are driven by individual drive means 3 and 3' comprising reduction gears coupled to an electric motor. These conveyor belts 2 and 2' have textile tube holders 4 attached to them which hold textile tubes 5 which are piled in the interior of the hopper 1 and engage on them.

Figure 10:
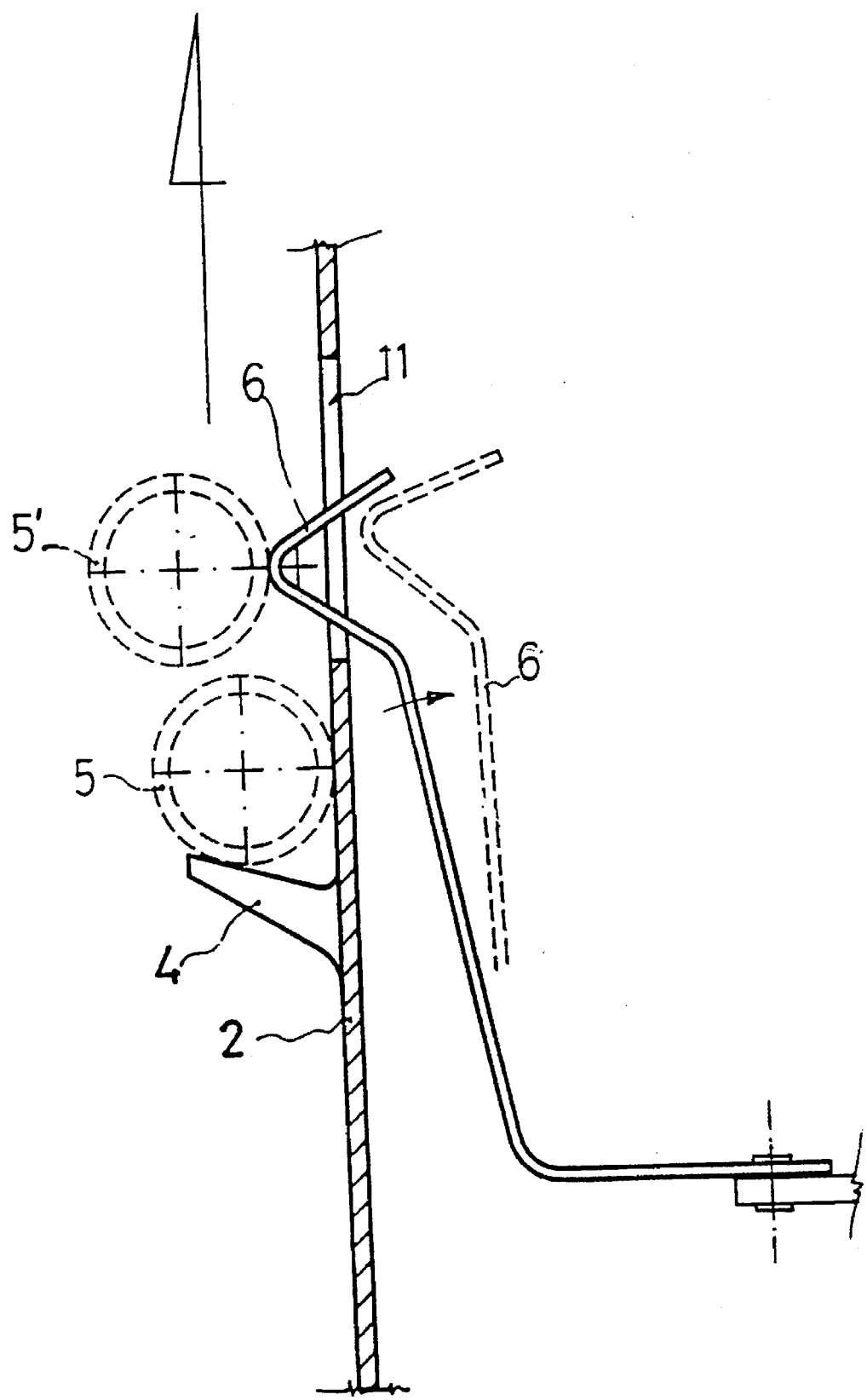
FIG. 10 is a detailed partially cross-sectional, partially side view of a portion of the mechanism of the ordering machine according to the invention including the conveyor belt and ejector spring.

The tubes 5 are taken and elevated unitarily, i.e. one on each tube holder 4. In the event that more than one textile tube is taken by one of the textile tube holders 4, the additional tubes are ejected by ejector spring 6 and thrown back into the hopper 1, as shown clearly in FIG. 10. Also if a textile tube has residual yarn already wound on it so that it has a larger effective diameter, it may be ejected by the ejector spring 6. Thus only textile tubes which are sufficiently empty are conveyed to the spinning machine C.

When the tubes are moved by the conveyor belt 2 or 2' to an end of the belt remote from the textile tubes 5 piled in the hopper 1, the tubes 5 so conveyed are conducted by guides 7 to bottom discharge means 8 of the ordering machine M from where they are fed to the continuous spinning machine C. The guides 7 are positioned adjacent and laterally to the conveyor belts 2 and 2'.

The vertical conveyor belts 2 and 2' raising the textile tubes 5 are movable independently because the respective electric drive means 3 and 3' operate independently of each other so that each side of the continuous spinning machine C can be fed separately and, as desired, in accordance with the operative process of delivery and positioning of the tubes at either side of the continuous spinning machine C.

Various embodiments of the tube holders 4 are shown in FIGS. 4 to 7. FIG. 4 shows a tube holder 4 made of an angular metal strip, preferably of aluminum, screwed onto the conveyor belt 2 via a screw-and-nut assembly 9 and 10. FIG. 5 shows a tube holder $4_1$ made of a strip, preferably of rubber, vulcanized onto the belt 2, this strip being angular in cross-section.

FIG. 6 shows another embodiment to the tube holder $4_2$ made of a strip of triangular cross-section vulcanized onto the belt 2, the cross-section of the tube 5 that is being held being also shown.

FIG. 7 is an additional embodiment of the tube holder $4_3$ formed by a vulcanized strip of trapezoidal cross-section.

As shown in FIGS. 8 and 9, the vertical conveyor belts 2 and 2' have one 11 or two apertures 11', according to choice, between tube holders. The purpose of these apertures is to permit the action, respectively of one or two ejector springs 6 on the tubes, as illustrated schematically in FIG. 10. These ejector springs 6, upon emerging through the apertures, eject any tube they contact which then drops toward the hopper 1 of surplus tubes. Only one tube 5 remains on each tube holder 4, since at the moment at which it passes in front of the ejector spring 6, it is held on the belt 2, since there is no suitably positioned aperture through which spring 6 can reach it or, alternatively, since the apertures 11 or 11' are not large enough.

Bottom discharge means 8 are provided at the end of the conveyor belts 2 and 2', as is shown in FIGS. 11 and 12, through which the tubes 5, now in order, are delivered to the continuous spinning machine C. These discharge means 8 are adjustable in their dimensions, in width as well as in length, and therefore, after dimensional adjustment, the ordering machine is able to perform its work with textile tubes of a different size.

For the same reasons, the position of the guides behind the conveyor belts 2 and 2' is also adjustable.

Two detectors 12, 13 beside each belt are likewise located in the vicinity of the bottom discharge means 8. The upper detector 12 controls operation of the machine according to the invention. In the event that tube feed is interrupted for any reason, the upper detector 12 places the ordering machine in an emergency stop, instantaneously actuating light and acoustic signals for signalling this stop, so that immediate corrective action is possible after examination of the machine.

The lower detector 13 monitors tubes dropping from the ordering machine, and whenever there is an absence of these from any of the bottom discharge means 8, the conveyor belts 2 and 2' start up immediately, according to the needs of each discharge means 8, and halt when the discharge means 8 are full.

Rear covers 14 and 14' are located behind the ordering machine. The function of these rear covers 14 and 14' is control and guidance of the textile tubes 5 through the rear zone of the ordering machine M to the discharge means 8. In the event of an obstruction caused by pile-up or incorrect positioning of any tube, they halt the machine M and the problem can be eliminated.

The special operation of these rear covers 14 and 14' at the rear of the ordering machine is effected by means of upper pivot fasteners 15, as can be seen in FIGS. 1 and 13, which permit free opening by lifting or pivoting of their lower portion, where an end-of-travel control 16 is located. The end-of-travel control 16 signals separation of the cover 15 from the rear of the machine M by action of the tube or tubes 5 which have been blocked or piled up. These piled or jammed up tubes 5 cause a separation of the cover from the machine and, consequently, a preventive stop of the ordering machine.

Initial feed of the machine according to the invention for ordering textile tubes, i.e. the filling of the hopper 1, is effected, as seen in FIG. 13, by a loading elevator 19, which raises a car 20 containing the tubes 5. This car 20 arrives with the tubes 5 to be ordered and an operator raises and tips the car 20 emptying it into the hopper 1, as shown in FIG. 14.

Another embodiment of the feed means for the hopper can include storage silos which are not shown in FIGS. 13 and 14. The conveyor belt 21 transports the tubes 5 from the unshown storage silos to the top of the hopper 1, where they drop and are diverted by the deflector 22.

A control and signalling panel 23, visible and accessible to the operators who monitor correct operation of the ordering machine, is situated at the side of the ordering machine. This control and signalling panel contains means for halting the machine M and starting and stopping the drive means 3 and 3' and is connected to the detectors 12 and 13 to receive signals from them for appropriate action as described above.

In conclusion, it should be indicated that the essential features and advantages of the ordering machine, are not altered by the embodiments changes in dimensions, exterior shape, materials and so on.

While the invention has been illustrated and embodied in an improved machine for ordering of textile tubes for a continuous spinning machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

What is claimed is:

1. Machine for providing a continuous spinning machine with an ordered sequence of textile tubes, comprising automatic ordering means for automatically ordering textile tubes without manual labor to form said ordered sequence of said textile tubes and means for automatically conducting said ordered sequence of said textile tubes to said continuous spinning machine to a predetermined one of two sides of said continuous spinning machine and means for adjustment of said ordering means for ordering different sized ones of said textile tubes;

wherein said automatic ordering means has a hopper including means for holding said textile tubes, said hopper having a rear wall; two identical parallel and vertical conveyor belts located at said rear wall of said hopper and each provided with a plurality of textile tube holders spaced from each other along said belt; a separate electric drive means for operating each of said conveyor belts, said electric drive means being operable independently of each other to drive said conveyor belts independently of each other so that, when said conveyor belts are operated by said electric drive means, said textile tubes held in said hopper are received on said textile tube holders and are raised to an end of said conveyor belts remote from said hopper; and wherein said means for automatically conducting includes bottom discharge means for guided discharge of said textile tubes to a distributor of said continuous spinning machine and lateral guides for guiding said textile tubes from said conveyor belts to said bottom discharge means.

2. Machine as defined in claim 1, further comprising control means for controlling said electric drive means; detector means for detecting an interruption in continuous feed of said textile tubes, said detector means being connected to said control means and positioned in the vicinity of said bottom discharge means beside each of said conveyor belts, said detector means sending a halt signal to said control means when said interruption in said continuous feed of said textile tubes is detected so that an automatic halt of said drive means occurs and additional detector means for detecting said textile tubes in said bottom discharge means, said additional detector means being connected to said control means and including means for generating a start signal for actuating said electric drive means to start a feed of said textile tubes when said bottom discharge means associated with said conveyor belt driven by said electric drive means is empty.

3. Machine as defined in claim 1, wherein each of said textile tube holders is an angular metallic section fastened to said conveyor belt.

4. Machine as defined in claim 3, wherein said metallic section is riveted to said conveyor belt.

5. Machine as defined in claim 3, wherein said metallic section is screwed to said conveyor belt.

6. Machine for providing a continuous spinning machine with an ordered sequence of textile tubes, said machine comprising automatic ordering means for automatically ordering textile tubes without manual labor to form said ordered sequence of said textile tubes and means for automatically conducting said ordered sequence of said textile tubes to said continuous spinning machine to a predetermined one of two sides of said continuous spinning machine and means for adjustment of said ordering means for ordering different sized ones of said textile tubes;

wherein said automatic ordering means has a hopper including means for holding said textile tubes, said hopper having a rear wall; two identical parallel and vertical conveyor belts located at said rear wall of said hopper and each provided with a plurality of textile tube holders spaced from each other along said belts; a separate electric drive means for operating each of said conveyor belts, said electric drive means being operable independently of each other to drive said conveyor belts independently of each other so that, when said conveyor belts are operated by said electric drive means, said textile tubes held in said hopper are received by said textile tube holders and raised to an end of said conveyor belts remote from said hopper; and wherein said means for automatically conducting includes bottom discharge means for guided discharge of said textile tubes to a distributor of said continuous spinning machine and lateral guides for guiding said textile tubes from said conveyor belts to said bottom discharge means;

wherein each of said textile tube holders is a rubber section vulcanized directly on said conveyor belt.

7. Machine as defined in claim 6, wherein said rubber section has a transverse cross section selected from the group consisting of angular, triangular and trapezoidal cross-sections.

8. Machine for providing a continuous spinning machine with an ordered sequence of textile tubes, said machine comprising automatic ordering means for automatically ordering textile tubes without manual labor to form said ordered sequence of said textile tubes and means for automatically conducting said ordered sequence of said textile tubes to said continuous spinning machine to predetermined one of two sides of said continuous spinning machine and means for adjustment of said ordering means for ordering different sized ones of said textile tubes;

wherein said automatic ordering means has a hopper including means for holding said textile tubes, said hopper having a rear wall; two identical parallel and vertical conveyor belts located at said rear wall of said hopper and each provided with a plurality of textile tube holders spaced from each other along said belt, said conveyor belts being provided with at least one aperture between adjacent ones of said textile tube holders; a separate electric drive means for operating each of said conveyor belts, said electric drive means being operable independently of each other to drive said conveyor belts independently of each other, so that, when said conveyor belts are operated by said electric drive means, said textile tubes held in said hopper are received by said textile tube holders and raised to an end of said conveyor belts remote from said hopper; and wherein said means for automatically conducting includes bottom discharge means for guided discharge of said textile tubes to a distributor of said continuous spinning machine and lateral guides for guiding said textile tubes from said conveyor belts to said bottom discharge means;

and ejection means for ejecting excess ones of said textile tubes carried on each of said textile tube holders during elevation of said textile tubes so that a single one of said textile tubes remains on each of said textile tube holders when said textile tube holder reaches said end of said conveyor belts, said ejection means comprising at least one spring mounted behind said conveyor belts and positioned to emerge from each of said at least one apertures in said conveyor belts and to eject said excess textile tubes on said textile tube holders.

9. Machine for providing a continuous spinning machine with an ordered sequence of textile tubes, said machine comprising automatic ordering means for automatically ordering textile tubes without manual labor to form said ordered sequence of said textile tubes and means for automatically conducting said ordered sequence of said textile tubes to said continuous spinning machine to a predetermined one of two sides of said continuous spinning machine and means for adjustment of said ordering means for ordering different sized ones of said textile tubes;

wherein said automatic ordering means has a hopper including means for holding said textile tubes, said hopper having a rear wall; two identical parallel and vertical conveyor belts located at said rear wall of said hopper and provided with a plurality of textile tube holders spaced from each other along said belt; a separate electric drive means for operating each of said conveyor belts, said electric drive means being operable independently of each other to drive said conveyor belts independently of each other so that, when said conveyor belts are operated by said electric drive means, said textile tubes held in said hopper are received by said conveyor belts and are raised to an end of said conveyor belts remote from said hopper; and wherein said means for automatically conducting includes bottom discharge means for guided discharge of said textile tubes to a distributor of said continuous spinning machine and lateral guides for guiding said textile tubes from said conveyor belts to said bottom discharge means, wherein said bottom discharge means and said lateral guides are adjustable in width so that said automatic ordering means can form ordered sequences of differently dimensioned ones of said textile tubes after adjustment by said means for adjustment.

10. Machine for providing a continuous spinning machine with an ordered sequence of textile tubes, said machine comprising automatic ordering means for automatically ordering textile tubes without manual labor to form said ordered sequence of said textile tubes and means for automatically conducting said ordered sequence of said textile tubes to said continuous spinning machine to a predetermined one of two sides of said continuous spinning machine and means for adjustment of said ordering means for ordering different sized ones of said textile tubes;

wherein said automatic ordering means has a hopper including means for holding said textile tubes having a rear wall; two identical parallel and vertical conveyor belts located at said rear wall of said hopper and each provided with a plurality of textile tube holders spaced from each other along said belt; a separate electric drive means for operating each of said conveyor belts, said electric drive means being operable independently of each other to drive said conveyor belts independently of each other so that, when said conveyor belts are operated by said electric drive means, said textile tubes are received on said conveyor belts and raised to an end of said conveyor belts remote from said hopper; and wherein said means for automatically conducting includes bottom discharge means for guided discharge of said textile tubes to a distributor of said continuous spinning machine and lateral guides for guiding said textile tubes from said conveyor belts to said bottom discharge means, and control-and-guidance means for guiding said textile tubes fed by said conveyor belts to said bottom discharge means, said control-and-guidance means comprising a pivotable cover having fasteners for mounting said cover and an end-of-travel detector in a lower portion of said pivotable cover including means for producing a signal for an instantaneous halt when an obstruction or pile-up of said textile tubes occurs.

* * * * *